US008818133B2

(12) United States Patent
Richards

(10) Patent No.: US 8,818,133 B2
(45) Date of Patent: Aug. 26, 2014

(54) POINT CLOUD CONSTRUCTION WITH UNPOSED CAMERA

(75) Inventor: Chet L. Richards, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 225 days.

(21) Appl. No.: 13/546,406

(22) Filed: Jul. 11, 2012

(65) Prior Publication Data

US 2014/0016857 A1 Jan. 16, 2014

(51) Int. Cl.
*G06K 9/32* (2006.01)
*G06K 9/00* (2006.01)

(52) U.S. Cl.
USPC .......................................... 382/294; 382/154

(58) Field of Classification Search
None
See application file for complete search history.

(56) References Cited

U.S. PATENT DOCUMENTS

2012/0177284 A1* 7/2012 Wang ............................ 382/154

FOREIGN PATENT DOCUMENTS

EP 2 597 620 A2 5/2013

OTHER PUBLICATIONS

Mordohai, et al. "Real-Time Video-Based Reconstruction of Urban Environments", Proceedings of 3DARCH: 3D Virtual Reconstruction and Visualization of Complex Architectures, 2007 (8 pgs.).
Sinha, et al., "Interactive 3D Architectural Modeling From Unordered Photo Collections", ACM Transactions on Graphics Proceedings of SIGGRAPH Asia 2008 (10 pgs.).
Van Gool, et al., "The MURALE Project: Image-based 3D Modeling for Archaeology", In: Niccolucci, F. (Ed.), VAST: International Symposium on Virtual Reality, Archaeology and Cultural Heritage, 2000, (13 pgs.).
Pollefeys et al., "Hand-Held Acquisition of 3D Models With a Video Camera", 3-D Digital Imaging and Modeling, 1999, Proceedings. Second International Conference on Ottawa, Ont., Canada, Oct. 4-8, 1999, Los Alamitos, CA,USA, IEEE Comput, Soc. US, Oct. 4, 1999 (pp. 14-23).
Park, et al., "A Multiview 3D Modeling System Based on Stereo Vision Techniques", Machine Vision and Applications, Springer, Berlin, DE, vol. 16, No. 3, May 1, 2005 (pp. 148-156).
Liu, et al., "High-Accuracy Three-Dimensional Shape Acquisition of a Large-Scale Object From Multiple Uncalibrated Camera Views", Applied Optics, Optical Society of America, Washington, D.C., US, vol. 50, No. 20, Jul. 10, 2011 (pp. 3691-3702).
Written Opinion of the International Searching Authority for International Application No. PCT/US2013/040208, filed May 8, 2013, Written Opinion of the International Searching Authority mailed Aug. 7, 2013 (7 pgs.).
International Search Report for International Application No. PCT/US2013/040208, filed May 8, 2013, International Search Report dated Jul. 31, 2013 and mailed Aug. 7, 2013 (4 pgs.).

* cited by examiner

*Primary Examiner* — Bhavesh Mehta
*Assistant Examiner* — David F Dunphy
(74) *Attorney, Agent, or Firm* — Christie, Parker & Hale, LLP

(57) ABSTRACT

A method for processing stereo rectified images, each stereo rectified image being associated with a camera position, the method including selecting a first pair of stereo rectified images; determining a first point cloud of features from the pair of stereo rectified images; determining the locations of the features of the first point cloud with respect to a reference feature in the first point cloud; selecting a second pair of stereo rectified images so that one stereo rectified image of the second pair is common to the first pair, and scaling a second point cloud of features associated with the second pair of stereo rectified images to the first point cloud of features.

17 Claims, 17 Drawing Sheets

POINT CLOUD CONSTRUCTION WITH UNPOSED CAMERA

BACKGROUND

The present disclosure relates to methods and systems for processing images.

It is well known that any pair of images, taken from two different positions, contains parallax information relating to the range to various objects in the scene. A three dimensional point cloud of features/objects can be constructed from stereo ranging measurements to the various scene features. However, if the physical locations of the cameras are unknown, the physical size of the point cloud will remain unknown and the cloud is defined as unscaled. In order to properly scale the point cloud to its true physical dimensions, the true camera locations should be known as well as the focal length (or angle calibration) of the camera.

If the camera is moved to three undefined locations, along some trajectory, it is possible to generate at least two stereo pairs of images. Each of these image pairs can generate a three dimensional point cloud of scene features. However, rescaling, rotating, and merging point clouds generated from multiple unknown camera positions is a challenging task. The problem compounds as the camera is moved to multiple positions so as to create multiple stereo pairs of images.

Existing techniques for merging point clouds from multiple images do not provide satisfactory results. The merged point clouds obtained with existing techniques only roughly approximate the original structures being modeled. Furthermore, these techniques require that all essential parts of a scene be visible to all the imagery.

SUMMARY

One embodiment relates to a method for processing stereo rectified images, each stereo rectified image being associated with a camera position, the method comprising: selecting a first pair of stereo rectified images; determining a first point cloud of features from the pair of stereo rectified images; determining the locations of the features of the first point cloud with respect to a reference feature in the first point cloud; selecting a second pair of stereo rectified images so that one stereo rectified image of the second pair is common to the first pair, and scaling a second point cloud of features associated with the second pair of stereo rectified images to the first point cloud of features.

Another embodiment relates to an article of manufacture comprising a physical, non-transitory computer readable medium encoded with machine executable instructions for performing a method for processing stereo rectified images, each stereo rectified image being associated with a camera position, the method comprising: selecting a first pair of stereo rectified images; determining a first point cloud of features from the pair of stereo rectified images; determining the locations of the features of the first point cloud with respect to a reference feature in the first point cloud; selecting a second pair of stereo rectified images so that one stereo rectified image of the second pair is common to the first pair, and scaling a second point cloud of features associated with the second pair of stereo rectified images to the first point cloud of features.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one example of the present disclosure, the structural components illustrated herein can be considered drawn to scale. It is to be expressly understood, however, that many other configurations are possible and that the drawings are for the purpose of example, illustration and description only and are not intended as a definition or to limit the scope of the present disclosure. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure provides a method for automatically constructing and merging and/or scaling feature point clouds from images taken from multiple unknown camera positions. The present disclosure provides the methodology and equations for reconstructing a three dimensional point cloud from the parallax positions of the feature points in multiple pairs of stereo rectified images. The images may be taken from multiple cameras or from a moving camera.

The present disclosure creates a single, correlated, point cloud from multiple stereo rectified image pairs using unposed cameras. For example, as a camera moves along some arbitrarily curved trajectory it views terrain and structures from multiple points of view. The camera may move all around the area of interest so that this area of interest is viewed from all directions.

In an embodiment of the invention, the methods and systems disclosed herein are configured to merge and/or scale point clouds generated from multiple captured images in accordance with the following scenarios. These scenarios are listed in order of increasing difficulty.

Scenario 1: The camera is attached to a high accuracy Inertial Navigation System (INS). In this scenario, the camera locations and orientations (poses) for each image in the sequence are known with considerable precision.

Scenario 2: In this scenario, shown in FIG. 1, a substantial number of scene features 1$a$-$d$ are observable from all camera positions 2$a$-$d$. Photography looking down from a circling aircraft is a typical example. In this situation an INS is very useful, but it is not essential. Automated stereo rectification and point cloud registration should suffice because all contributing point clouds share scene features.

Scenario 3: In this scenario, motion is constrained and there are major obscurations. The typical situation is a sequence of imagery taken from an automobile as it drives around a building. The constraint is provided by the roadway. Over flat terrain, this constraint significantly reduces the degrees of freedom of the problem. On the other hand, the front side and area around a building will become invisible when the vehicle is on the back side. Thus, a starting ensemble of feature points will progressively become invisible as new features come into view. It is desirable that the point cloud be continuously merged with the growing ensemble cloud as the camera moves to new positions. The real difficulty occurs when the camera moves back to, or close to, its starting position (i.e. closing the circle). In an embodiment, the methods and systems disclosed herein adjust the individual point clouds to get the best possible match to the real physical situation.

Figure 2:
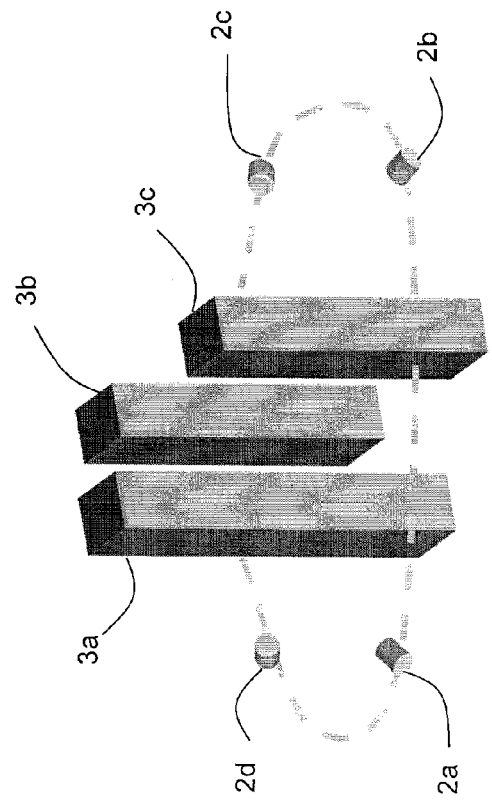
FIG. 2 illustrates a camera capturing a scene according to a second scenario.

Scenario 4: In this scenario, shown in FIG. 2, there are no constraints on the camera trajectory, or pose, as it moves around an obscuring structure. The original point cloud cannot be observed from all camera positions. A typical situation is a camera that is attached to a small aircraft which is flying around, but is below the top of, a large building. FIG. 2 shows the camera positions 2$a$-$d$ and the buildings 3$a$-$c$.

Figure 1:
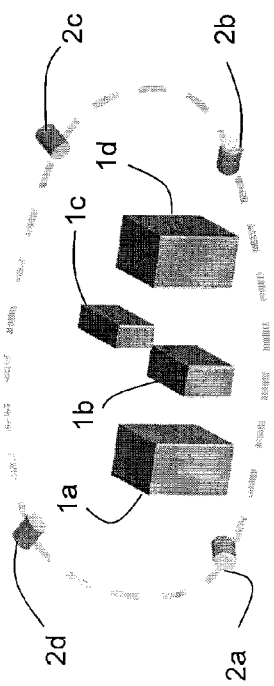
FIG. 1 illustrates a camera capturing a scene according to a first scenario.
Figure 3:
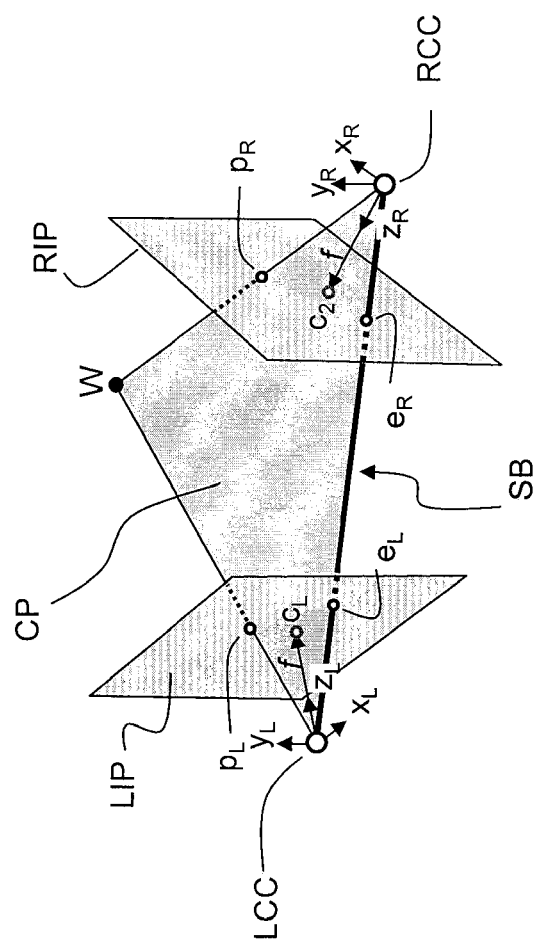
FIGS. 3 and 4 show the geometrical relationships for a moving camera in two different positions or for two arbitrarily oriented cameras in accordance with an embodiment.

FIG. 3 shows how a camera, in two different positions, views one object in the scene of FIGS. 1 and 2. The camera is moved from the left position to the right position (or vice versa). The camera, in the two positions, is observing the point, W, in the outside world, which is some distance outwards from the camera. It will be appreciated that the present discussion is also applicable to two or more different cameras that view the object W, instead of a single moving camera.

The camera is defined by a camera center and an image plane. FIG. 3 shows the right camera center RCC, left camera center LCC, right image plane RIP and left image plane LIP. In a real camera, the true camera center is the nodal point of the lens and is in front of the focal plane (or true image plane). This results in the projection of an inverted image onto the focal plane. For convenience, the camera center (i.e. lens nodal point) is defined to be a point behind an artificially defined image plane. This results in an upright image.

The camera has a local x,y,z coordinate system (attached to the camera) which is centered at the camera center. In this local coordinate system there is a vector, z, the principal vector, from the camera center to the center of the image plane. This z vector is perpendicular to the image plane and touches the image plane at the image center point, c. The distance from the camera center to the image plane, f, is the focal length of the camera. In this local coordinate system the x and y axes are parallel to the image plane. Conventionally, the y-axis lies in the vertical direction.

FIG. 3 also shows the stereo baseline SB, which is the line that joins the two camera centers RCC and LCC. In one embodiment, it is the axis which makes it possible to reconstruct three dimensional scenes from the two camera positions. This axis is also the measurement baseline for distance measurement. The points where the stereo baseline SB penetrates the left and right image planes LIM, RIP are called the left and right epipoles ($e_L$ and $e_R$).

The two cameras are observing a common world point, W. This point, together with the two camera centers RCC, LCC, defines a plane, referred to as the common plane CP. Because the baseline also joins the two camera centers, the stereo baseline SB therefore lies in this plane CP. It will be appreciated that there are an infinite number of points which lie in this common plane CP. Any two of these points will form the ends of a line in the image plane.

As can be seen in FIG. 3, the ray from a camera center to the common point W passes through the image plane at the point, p. There will be a point $p_L$ for the left image and a point $p_R$ for the right image.

The scene object, at point, W, as seen by the camera in either of its positions, has vector coordinates $X_{WL}, Y_{WL}, Z_{WL}$ or $X_{WR}, Y_{WR}, Z_{WR}$ with respect to the camera centers. From a single camera position, it is not possible to determine how far away the object W is from the camera center. The direction may be known, but not the distance. The direction with respect to the camera's orientation is known from the location of the image of W on the image plane. The ray between the camera center and W intercepts the image plane at the vector location $x_p, y_p, f$. Thus, the image location of this object can be defined by the vector $p=[x_p, y_p, f]$. The focal length of the camera can be adjusted to unity: $f=1$. The rescaling is the result of dividing all the vector components by f. This is a reasonable rescaling because, in many cases, the focal length is unknown, but the angles to various object locations can be measured. The abstract image of W is therefore defined by the vector $[x_p, y_p, 1]$. Here, the focal length is retained as part of the image vector.

Figure 4:
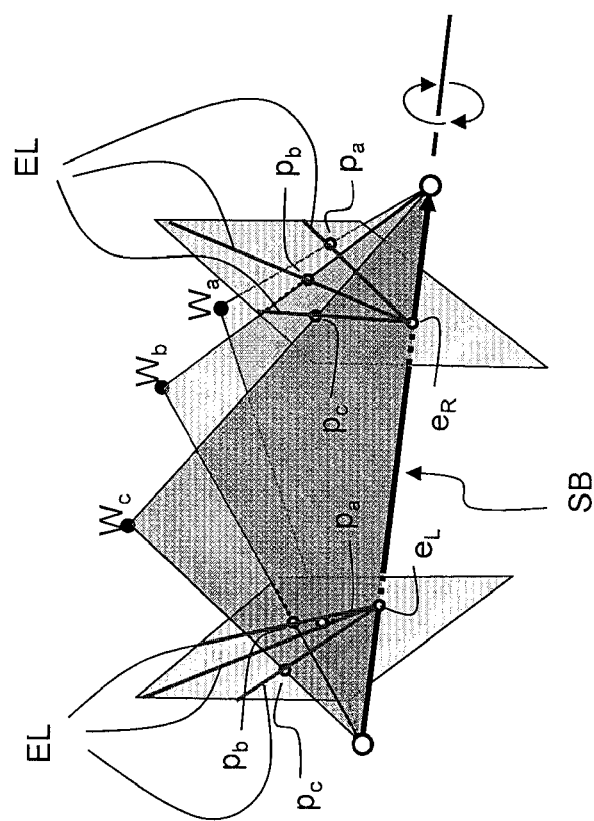

In general, there will be a multitude of world points, $W_a$, $W_b$, $W_c$ W in the observed far field. Each of these points will have its own common plane and each of these common planes will intersect the stereo baseline. As a result, these planes radiate out from the stereo baseline. FIG. 4 shows the general configuration. This ensemble of radiating planes is referred to as a pencil of planes and each of these planes may be referred to as a pencil plane. As seen in FIG. 4, the rays from camera centers to the common points, $W_a$, $W_b$, $W_c$, pass through an image plane at points, $p_a$, $p_b$, $p_c$ for the right and the left camera.

Objects, or features, $W_a$, $W_b$, $W_c$, in the far field are connected to the camera center by light rays. The images of these features occur where their rays pass through the image plane at points, $p_a$, $p_b$, $p_c$. Each far field feature is one corner of a triangle, with the other corners being the camera centers.

Such a triangle is part of an extended plane which passes through the stereo baseline SB. Where this feature plane also passes through the image plane, this intersection is defined as an epipolar line EL. Each plane and feature has a corresponding epipolar line EL which radiates from the epipole. Specifically, as shown in FIG. 4, the epipolar lines EL radiate from the epipoles $e_R$, $e_L$, where the stereo baseline SB penetrates through the image planes RIP, LIP. These radiating epipolar lines make up a kind of "star," or fan, of rays. An epipolar star corresponds to the intersection of the pencil planes with the image plane. It will be appreciated that when the cameras face each other, so that the image planes are parallel, the epipolar stars, in the left and right cameras, are mirror images of each other.

The relative camera geometry of FIGS. 3 and 4 has the cameras pointed roughly towards each other. This relative orientation ensures that the epipoles will be properly placed in the images. However, it will be appreciated that, in other situations, the cameras may splay so that they point somewhat away from each other. In this case the stereo baseline SB passes through the camera centers before intersecting the image planes. Thus, the epipoles move to the opposite sides of the images.

In another case, the cameras may both point perpendicular to the stereo baseline SB. In this case, the epipoles are at infinity and it is no longer possible to define finite epipoles. As long as the cameras are also parallel—a condition defined as stereo rectified—the relative distances to various objects can be determined by their relative parallax motions. However, if the cameras have relative tilt (the cameras are rotated through different angles around the stereo baseline so that they are no longer parallel to each other), then the image motions are confused. Without correction to the stereo rectified camera position, range measurement becomes difficult.

Stereo rectification involves aligning the cameras perpendicular to the stereo baseline SB and parallel to each other. When this is done all the features in the left camera will move along parallel, and horizontal, lines to reach their positions in the right camera. The epipoles $e_R$, $e_L$, will be at infinity in both cameras. In practice, the cameras (or a single moving camera) will typically not be in stereo rectified position when the images are formed. Virtual, or homographic, mapping of the original images should therefore be performed to create the desired pair of stereo rectified images.

Figure 5:
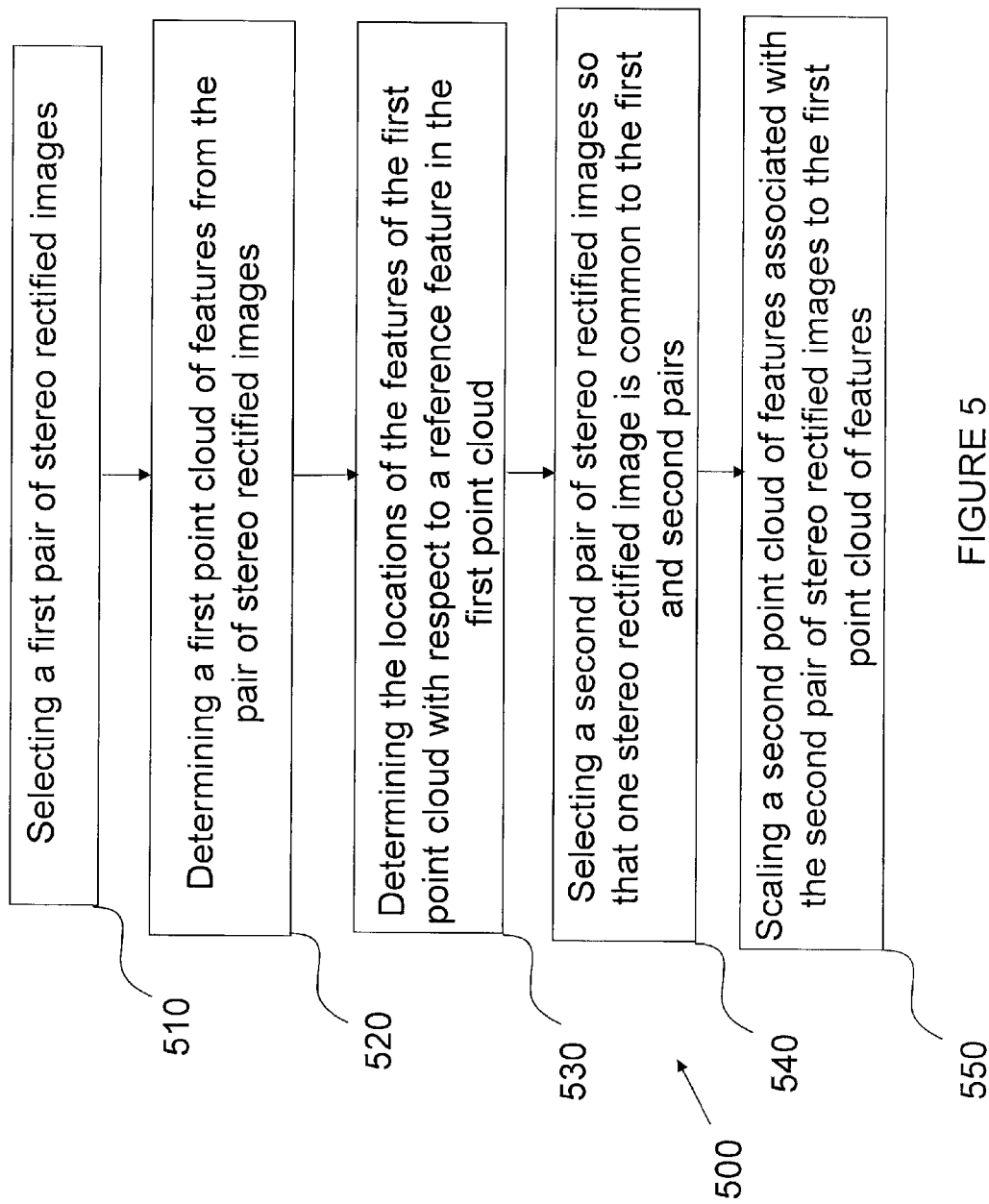
FIG. 5 shows a method for processing stereo rectified images in accordance with an embodiment.

Referring now to FIG. 5, this figure shows a method 500 for processing stereo rectified images in accordance with an embodiment.

The method 500 comprises operation 510 where a first pair of stereo rectified images is selected. In an embodiment, stereo rectification of the pair of images is carried out in accordance with one or more methods described in co-pending U.S. application Ser. No. 13/445,454, entitled "Stereo Rectification Method" filed Apr. 12, 2012, the entire disclosure of which is incorporated by reference in its entirety. However, this is not limiting. It is envisioned in other embodiments to stereo rectify the images in accordance with other methods, including, for example, those that are based on the construction of the Essential Matrix.

The method 500 then proceeds to operation 520 where a first point cloud of features from the pair of stereo rectified images is determined. The first point cloud of features includes one or more objects and/or object features that are captured by the images.

In one embodiment, operation 520 may include determining the unscale range to each feature from the stereo rectified pair of images. This is done as follows. For example, FIG. 6 shows the geometry of a point or feature P in the plane defined by the stereo baseline SB and the point P.

Figure 6:
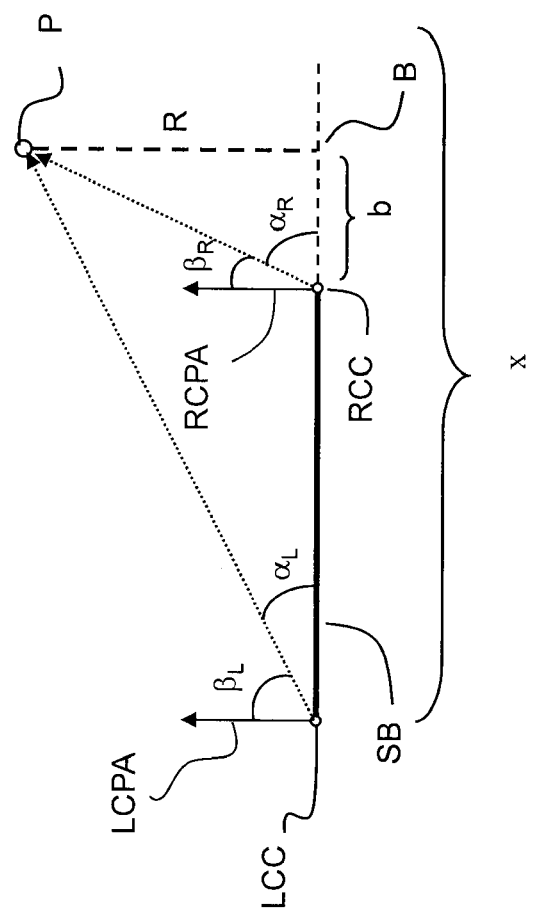
FIG. 6 shows the geometry of a point in the plane defined by the stereo baseline and the point in accordance with an embodiment.

FIG. 6 shows two cameras: a left camera and a right camera. The cameras are oriented parallel to each other and face in the direction of their principal axes RCPA and LCPA. The cameras are separated by the stereo baseline, SB, and are oriented perpendicular to this baseline.

The cameras observe a feature in the far field. The feature is a distance, R, perpendicular to the (extension of) the stereo baseline. The feature is also a distance x from the left camera along the stereo baseline.

The angle between the ray to this object and the principal axis is $\beta$. The complementary angle, between this ray and the stereo baseline, is $\alpha$.

With these definitions, it is now possible to develop the equation for the distance R of the object from the stereo baseline and the distance x of the object along the stereo baseline from the left camera position.

As seen in FIG. 6:

$$R = (B+b)\tan\alpha_L \quad (1)$$

$$b = \frac{R}{\tan\alpha_R} \quad (2)$$

Substituting equation (2) into equation (1) and rearranging, R can be defined as follows:

$$R = \frac{B\tan\alpha_L \tan\alpha_R}{\tan\alpha_R - \tan\alpha_L} \quad (3)$$

Using trigonometric substitutions, equation (3) becomes:

$$R = \frac{B\sin\alpha_L \sin\alpha_R}{\sin(\alpha_R - \alpha_L)} \quad (4)$$

It is noted that $\alpha_L = 90 - \beta_L$, and $\alpha_R = 90 - \beta_R$. Substituting these relationships into equation (4) and using the appropriate trigonometric conversions, provide:

$$R = \frac{B\cos\beta_L \cos\beta_R}{\sin(\beta_L - \beta_R)} \quad (5)$$

The distance, x is given by:

$$x = B + b$$

By rearranging equation (4) to isolate B and substitute this, together with equation (2) into equation (6), and after some manipulation and trigonometric substitution, equation (7) is obtained:

$$x = B\left(\frac{\sin(\beta_L - \beta_R) + \cos\beta_L \sin\beta_R}{\sin(\beta_L - \beta_R)}\right) \quad (7)$$

With further manipulation, resulting from trigonometric expansion of the angle difference sine, this reduces to the desired form:

$$x = B\left(\frac{\cos\beta_R \sin\beta_L}{\sin(\beta_L - \beta_R)}\right) \quad (8)$$

Figure 7:
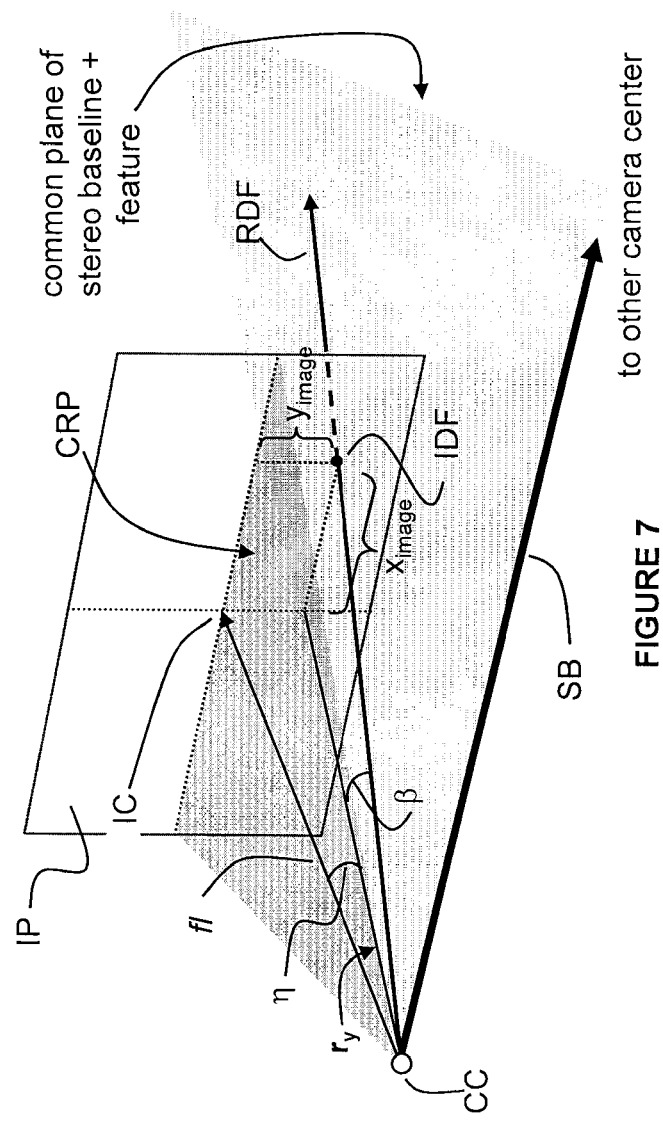
FIG. 7 shows the geometry of a pair of stereo rectified images in accordance with an embodiment.

Angle, β, is used to tell the direction to a feature within the common plane CP defined by that feature and the two camera centers. However, it will be appreciated that this common plane will be oriented differently for each such feature. Assuming the cameras are stereo rectified, parallel, and pointing in some arbitrary direction. The cameras then define a reference plane which passes through the image centers of both cameras (i.e. the plane lies along the x-axes). In general, the plane defined by a particular feature and the camera centers (i.e. the stereo baseline) will not coincide with this standard camera reference plane. The two planes will intersect with an angle, η, between them. FIG. 7 shows the geometry. FIG. 7 shows the camera center CC, the stereo baseline SB, the image plane IP, the image center IC, the camera reference plane CRP, the principal axis focal length fl, the image of distant feature IDF, the ray to distance feature RDF, and the common plane of stereo baseline SB and feature P.

The angle, β, defines the direction to the distant feature within the common stereo plane. Thus, this angle is defined with respect to a reference vector, $r_y$, which also lies within this plane. The vector $r_y$ terminates at the image plane, but its length is not equal to the camera focal length. The angle β is thus given by:

$$\tan\beta = \frac{x_{image}}{r_y} = \frac{x_{image}}{\sqrt{y_{image}^2 + fl^2}} \quad (9)$$

The angle, η, is given by:

$$\tan\eta = \frac{y_{image}}{fl} \quad (10)$$

In developing a three dimensional point cloud from the stereo parallax measurements, it is desirable to provide a reference orientation so that both cameras are tilted the same. In one embodiment, this orientation is developed by arbitrarily assigning one of the features to be the reference feature. Through perspective rotations of the left and right camera images, this reference feature is placed on the x-axis in both the left and right images. It will be appreciated that moving the reference feature to the x-axis results in a corresponding perspective transformation motion of all the other features, as well. Once these rotations have been completed, so that the cameras are parallel and fully stereo rectified, then the angle, η, provides the vertical reference angle of each feature with respect to the reference feature.

An alternative scheme would be to bring the reference feature to an arbitrary y-axis location in both cameras and then to simply compute the relative angles, $η_i$, for each of the other features.

Figure 8:
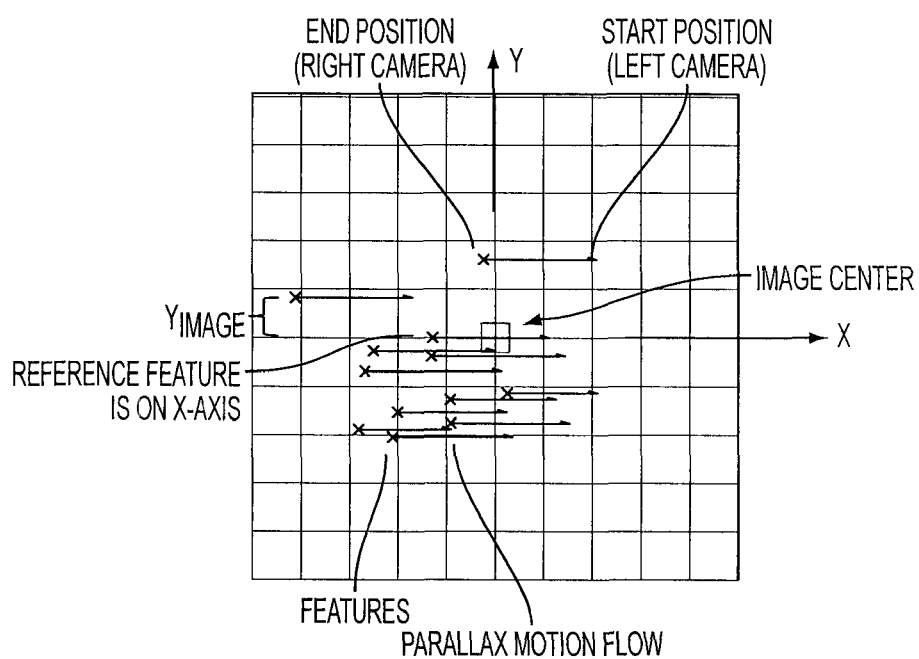
FIG. 8 shows the results of simulation of a three dimensional test pattern of features in accordance with an embodiment.

FIG. 8 shows the results of a simulation of a three dimensional test pattern of features. The pattern shows the motions of the features as observed by stereo rectified cameras. Upon achieving stereo rectification of the cameras, the motion of all the features will be parallel to the x-axis of the image plane. The length of the image motion streaks is related to the distance of the feature from the stereo baseline and the length of the stereo baseline, as seen in the foregoing equations. The distance measurements are local to point cloud features and thus are accurate.

Referring back to FIG. 5, the method proceeds to operation 530, where the locations of the features of the first point cloud with respect to a reference feature in the first point cloud are determined.

As noted previously, these features in the captured images are presumed to be elements of some object out in the world. In an embodiment, in order to find the geometrical relationships of these features relative to each other, a local Cartesian coordinate system is established into which the locations of the features are embedded.

This local coordinate system is related to the relationship between the world object and the stereo camera pair. In general, the local coordinate system will not correspond to a coordinate system growing out of the ground plane. Rather, the local coordinate system may be established by selecting some world object feature as the origin of the local coordinate system. The reference plane is the plane defined by the locations of this feature and the two camera centers.

Figure 9:
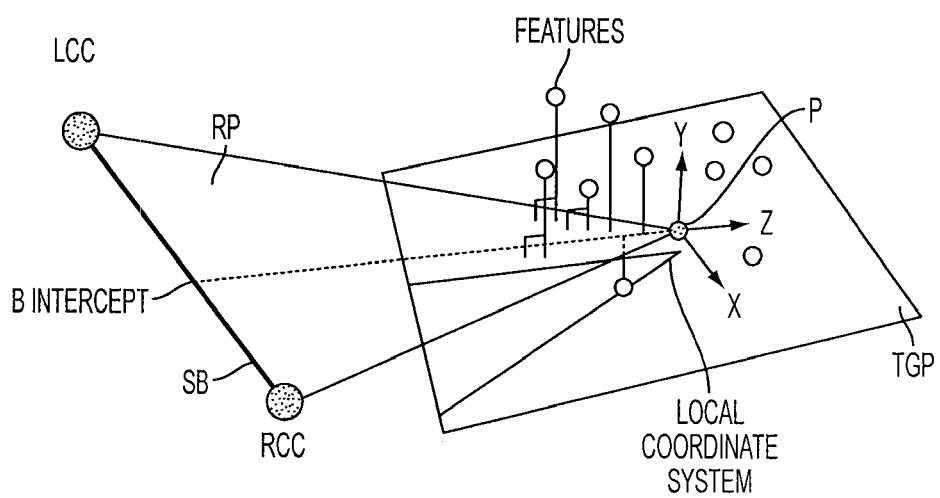
FIG. 9 shows the general relationships of the local coordinate system to the stereo cameras in accordance with an embodiment.

FIG. 9 shows the general relationships of the local coordinate system to the stereo cameras. As the figure illustrates, the reference plane is independent of the true ground plane TGP, and so is the local X,Y,Z coordinate system. The origin of the local coordinate system is the location of the reference feature P. In the local coordinate system, X is parallel to the stereo baseline SB, Z is perpendicular to the stereo baseline SB and Y is perpendicular to the camera-plus-reference-feature reference plane.

The coordinate system origin is at the principal feature P. The principal reference plane RP passes from this feature through the two anchoring cameras (and camera centers LCC and RCC).

Figure 10:
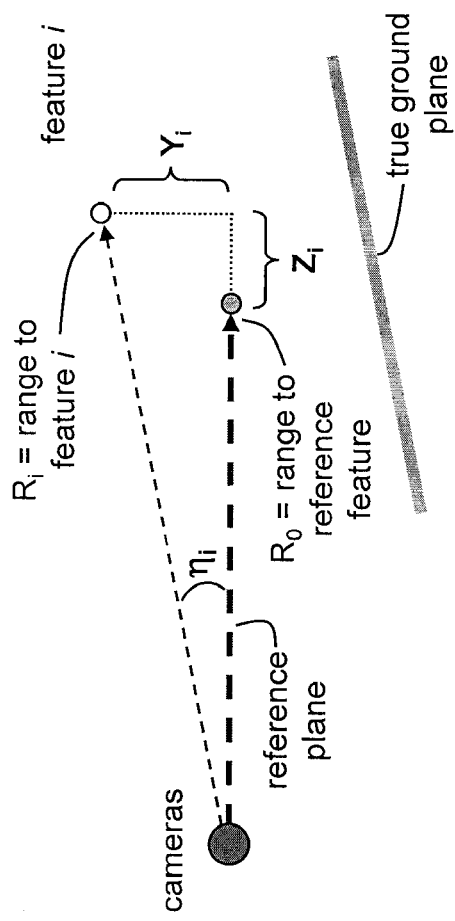
FIG. 10 shows a side view of the reference plane, the reference feature and an arbitrarily selected feature in accordance with an embodiment.

FIG. 10 shows a side view of the reference plane RP, the reference feature P and an arbitrarily selected feature, designated by the index, i. In FIG. 10, the angle between the reference plane and the i feature is $η_i$.

The local x and y coordinates of feature i are:

$$Z_i = R_i \cos\eta_i - R_0 \quad (11)$$

and, using equation (10):

$$Y_i = R_i \sin\eta_i \quad (12)$$

Figure 11:
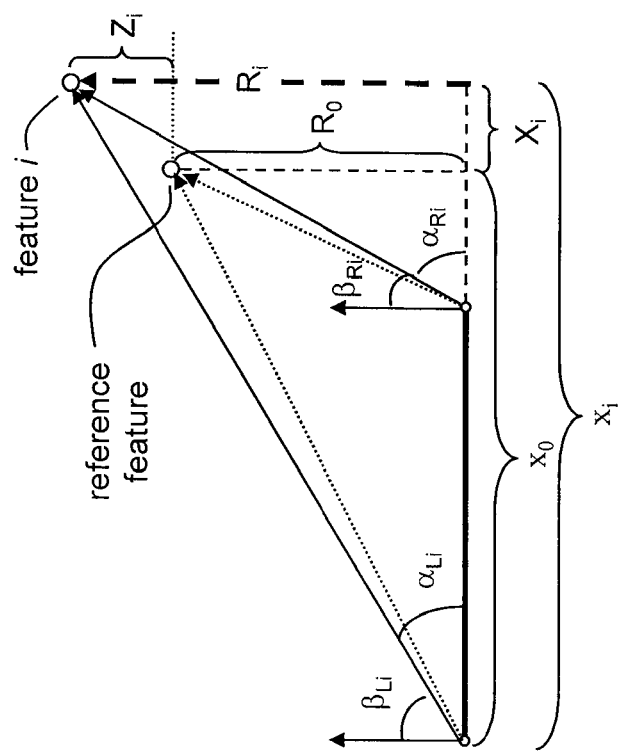
FIG. 11 shows the coordinates of the arbitrarily selected feature in the coordinate system of the reference feature in accordance with an embodiment.

The third local coordinate, $X_i$, is found by reexamining FIG. 3. FIG. 11 shows the appropriate modifications to FIG. 6.

Using equation (8), equation (13) is obtained:

$$X_i = x_i - x_0 = B\left(\frac{\cos\beta_{Ri}\sin\beta_{Li}}{\sin(\beta_{Li} - \beta_{Ri})} - \frac{\cos\beta_{R0}\sin\beta_{L0}}{\sin(\beta_{L0} - \beta_{R0})}\right) \quad (13)$$

The foregoing embodiment shows how to compute the locations of multiple feature points with respect to a reference feature point P. In this embodiment, the reference feature P is located at the origin of a local Cartesian coordinate system and the orientation of this local coordinate system is controlled by the locations of the two cameras. It will be appreciated that, in the foregoing embodiment, any feature point can serve as the origin of the local coordinate system.

Referring back to FIG. 5, after determining the locations of the features of the first point cloud with respect to a reference feature P in the first point cloud, the method 500 proceeds to operation 540 where a second pair of stereo rectified images are selected so that one stereo rectified image is common to the first and second pairs. This is done to merge and/or scale the point cloud of features generated from the second pair of stereo rectified images with the first point cloud of features from the first pair of stereo rectified images at operation 550.

In an embodiment, this is done by linking the third camera orientation to the first and second camera orientations. This is done in an embodiment by constructing and/or defining a master local coordinate system.

Figure 12:
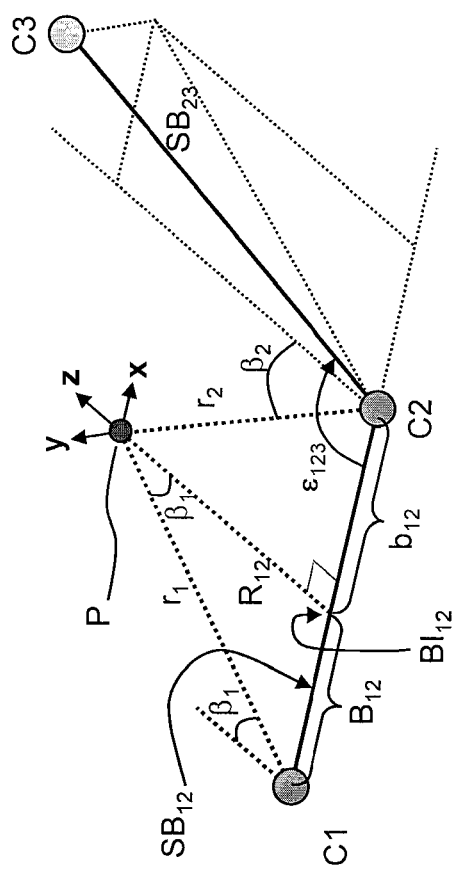
FIG. 12 shows the relative positions of a first, second and third cameras in accordance with an embodiment.

FIG. 12 shows how the master local coordinate system is defined. First, two camera positions C1, C2 are arbitrarily selected from a sequence of positions. The line between the two camera centers is defined as the primary stereo baseline, identified as $SB_{12}$ in FIG. 12. In accordance with the definitions of FIG. 6, a perpendicular segment, $R_{12}$, is drawn from the stereo baseline $SB_{12}$, at the baseline intercept point, $BI_{12}$, to the selected reference feature P. Then, this segment divides this baseline into distances $B_{12}$ and $b_{12}$. $B_{12}$ is the distance of $R_{12}$ from camera C1 in the negative x-direction of the local Cartesian coordinate system. The distance, $R_{12}$, of the origin of the local coordinate system from the stereo baseline $SB_{12}$ is given by equation (5).

Once $R_{12}$ has been determined as an scale reference distance, it is possible to obtain the similarly scaled $B_{12}$, $b_{12}$, $r_1$ and $r_2$ through simple trigonometry, as follows:

$$B_{12} = R_{12}\tan\beta_1 \quad (14)$$

$$b_{12} = R_{12}\tan\beta_2 \quad (15)$$

$$r_1 = \frac{R_{12}}{\cos\beta_1} \quad (16)$$

$$r_2 = \frac{R_{12}}{\cos\beta_2} \quad (17)$$

As shown in FIG. 12, camera C3 will typically not lie in the reference plane formed by cameras C1 and C2 and the reference feature point P. Moreover, while angle, $\epsilon_{123}$, between the $SB_{12}$ stereo baseline and the $SB_{23}$ stereo baseline, is known, the length of $SB_{23}$ is not known. Nor is the elevation angle of $SB_{23}$ with respect to the reference plane and the reference local coordinate system known. However, the ratio of $SB_{23}$ to $SB_{12}$ can be determined. Since the length of $SB_{12}$ may be unknown, it is not possible to obtain the true length of $SB_{23}$, but it is possible to assemble a properly scaled model of the feature point cloud from measurements made at all three camera positions C1, C2 and C3.

In an embodiment, the location of camera C3 is determined in the local coordinate system by the following procedure:

First, the angle, $\epsilon_{123}$, between the stereo baselines $SB_{12}$ and $SB_{23}$ is determined. This can be done with the unrectified initial image from camera C2. During the process of stereo rectification of the camera C1 and camera C2 images, it is possible to recover the location of the camera C1 epipole in camera C2's original image. This may be accomplished by standard techniques developed by the Multiview Geometry community. Similarly, during the process of separately stereo rectifying the images from cameras C2 and C3, it is possible to recover the location of the camera C3 epipole in camera C2's original image of the scene. The angle, with respect to the camera center, between these two epipoles is $\epsilon_{123}$.

After cameras C2 and C3 have been stereo rectified together, the reference feature P is located and the newly rectified camera C2 and camera C3 images are virtually tilted so that the image of this feature P lies along the x-axis of cameras C2 and C3. This establishes a new plane with triangular corners at camera C2, camera C3 and the reference feature P.

Figure 13:
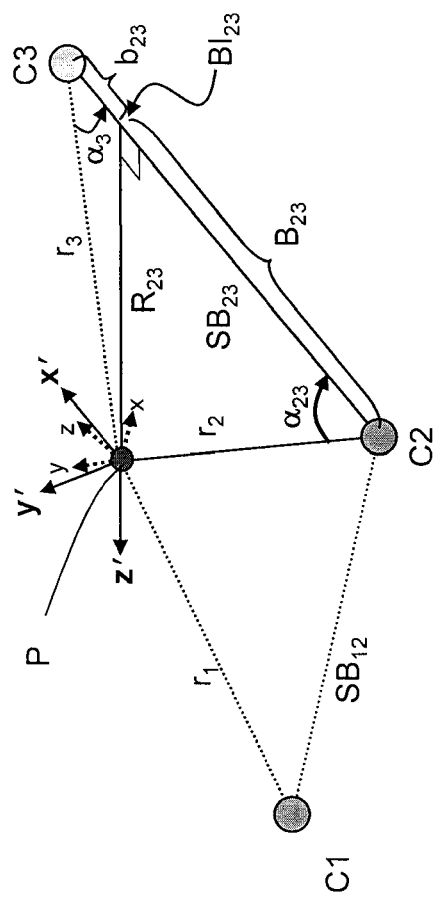
FIG. 13 shows the position of the third camera in the coordinate system of the first and second cameras in accordance with an embodiment.

With this new plane, it is possible to create a secondary local Cartesian coordinate system, defined by the coordinates, x', y', z'. These coordinates are oriented to the plane defined by cameras C2 and C3 and the reference feature P, but they are oriented to the $SB_{23}$ stereo baseline. This new local coordinate system is illustrated by FIG. 13.

In order to determine the intercept, $BI_{23}$, of $R_{23}$ with the $SB_{23}$ baseline, a transformation is defined to transform the, x', y', z' coordinate system to the reference x, y, z, coordinate system.

In an embodiment, the desired transformation is defined according to the matrix equation which carries an object at some x', y', z' location to its equivalent x, y, z coordinates:

$$\begin{bmatrix} x \\ y \\ z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} x' \\ y' \\ z' \end{bmatrix} \quad (18)$$

The nine coefficients of matrix [A] can be determined as follows.

It is assumed that the procedures associated with FIGS. 10 and 11 and equations (11) through (13) have been followed so that the coordinates of the various feature points have been determined in the reference x, y, z, coordinate system. Not all of these features will be seen from the camera C3 position. So, those features which can be seen by all three cameras are selected from the total ensemble of observed features. In an embodiment, a least squares method uses this subset of common features to estimate the coefficients of [A]. The method according to an embodiment uses the least square coordinate transformation combined with knowledge of the epipoles. There are at least three distinct (and non-coplanar) features in the common subset which are not coplanar with the reference feature.

Because the location of the second camera C2 is initially unknown, the distance from the stereo baseline $SB_{23}$ to the reference feature and the other common feature set will also be unknown. Thus, the apparent size of this common feature point cloud will usually be different for the camera pair C1-C2 than for the camera pair C2-C3. Finding the transformation matrix which couples the x, y, z coordinate system with the x', y', z' coordinate system therefore will involve a rescaling of both point clouds so that they match in all but orientation (operation 550).

In an embodiment, the rescaling process is done as follows. Each point cloud is treated as a single vector and the norm of the vector is determined. Then, each point is rescaled in the cloud by dividing it by this norm. Thus, the following equations are obtained:

$$\text{norm}_{12} = (x_1^2 + y_1^2 + z_1^2 + x_2^2 + y_2^2 + z_2^2 + \ldots + x_n^2 + y_n^2 + z_n^2)^{1/2} \quad (19)$$

and $$\text{norm}_{23} = (x_1'^2 + y_1'^2 + z_1'^2 + x_2'^2 + y_2'^2 + z_2'^2 + \ldots + x_n'^2 + y_n'^2 + z_n'^2)^{1/2} \quad (20)$$

Then, the measured locations of the feature points are replaced with the normalized locations of the feature points:

$$x_1 \to x_1/\text{norm}_{12}, y_1 \to y_1/\text{norm}_{12}, \ldots x_1' \to x_1'/\text{norm}_{23},$$
$$y_1' \to y_1'/\text{norm}_{23}, \ldots \text{etc.} \quad (21)$$

Next, the matrix transformation is developed. A matrix transformation is developed between two feature point matrices which may be overdetermined. The desired solution should use as many good features as possible so as to minimize the impact of feature position errors. Equation (22) provides the starting matrix description:

$$\begin{bmatrix} x_1 & x_2 & & x_n \\ y_1 & y_2 & \cdots & y_n \\ z_1 & z_2 & & z_n \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} x'_1 & x'_2 & & x'_n \\ y'_1 & y'_2 & \cdots & y'_n \\ z'_1 & z'_2 & & z'_n \end{bmatrix} \quad (22)$$

For convenience, equation (22) is rewritten as:

$$[X] = [A][X'] \quad (23)$$

Then, both sides of (23) are right multiplied by the transpose of X':

$$[X][X']^T = [A][X'][X']^T \quad (24)$$

Next, a correlation (or autocorrelation) matrix is defined:

$$[C] \equiv [X'][X']^T = \begin{bmatrix} \sum x'^2_i & \sum x'_i y'_i & \sum x'_i y'_i \\ \sum x'_i y'_i & \sum y'^2_i & \sum y'_i z'_i \\ \sum x'_i z'_i & \sum y'_i z'_i & \sum z'^2_i \end{bmatrix} \quad (25)$$

So that equation (24) can be written as:

$$[X][X']^T = [A][C] \quad (26)$$

Finally, both sides are right multiplied by the inverse of [C]:

$$[X][X']^T[C]^{-1} = [A][C][C]^{-1} = [A]$$

Thus, [A] is defined as:

$$[A] = [X][X']^T[C]^{-1} \quad (27)$$

Equation (27) has an additional correlation matrix:

$$[X][X']^T = \begin{bmatrix} \sum x'_i x_i & \sum x_i y'_i & \sum x_i z'_i \\ \sum x'_i y_i & \sum y_i y'_i & \sum y_i z'_i \\ \sum x_i z'_i & \sum z_i y'_i & \sum z_i z'_i \end{bmatrix} \quad (28)$$

Equation (27) provides the relationship between the two coordinate systems.

Equation (23) can be used to find the direction along $R_{23}$ to the intercept with the stereo baseline $SB_{23}$. But first, the length of $R_{23}$ should be determined. This can be done as follows.

From simple measurements in the stereo rectified image of camera C2, the angle, $\alpha_{23}$, of the reference feature with respect to the ($SB_{23}$ rectified) camera C2 center is determined. Using equation (17) and the rectified images from cameras C1 and C2, the distance $r_2$ to the origin of the local reference coordinate system(s) is determined. From FIG. 13, the simple relationships are determined:

$$R_{23} = r_2 \sin \alpha_{23} \quad (29)$$

and:

$$B_{23} = r_2 \cos \alpha_{23} \quad (30)$$

In order to find $BI_{23}$, the z' direction is converted to the x, y, z reference coordinate system and the resulting vector is extended a distance $R_{23}$ to the baseline intercept, $BI_{23}$. This is done with appropriate normalization of the transformed coordinates.

The desired direction vector is developed using equation (23):

$$\begin{bmatrix} x_{norm} \\ z_{norm} \\ z_{norm} \end{bmatrix} = \frac{1}{norm} \left( \begin{bmatrix} x_A \\ y_A \\ z_A \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} 0 \\ 0 \\ -1 \end{bmatrix} \right) \quad (31)$$

Where the normalization factor is:

$$\text{norm} = \sqrt{x_A^2 + y_A^2 + z_A^2} \quad (32)$$

The location of $BI_{23}$ in the reference local coordinate system is therefore a vector position with the components:

$$x_{BI23} = R_{23} x_{norm}, y_{BI23} = R_{23} y_{norm}, z_{BI23} = R_{23} z_{norm} \quad (33)$$

Next, the relative camera coordinates are determined. It is now possible to find the locations of the three cameras C1, C2 and C3 in the local reference coordinate system, x, y, z. According to FIG. 12, the location of camera C1 has the following coordinates in the local reference coordinate system.

$$x_1 = -B_{12}, y_1 = 0, z_1 = -R_{12} \quad (34)$$

Similarly, camera C2 is located at:

$$x_2 = b_{12}, y_2 = 0, z_2 = -R_{12} \quad (35)$$

To determine the location of camera C3, a vector is extended from camera 2, through intercept $BI_{23}$ to a location $SB_{23}$ from camera C2. The distance from camera C2 to intercept BI23 is, using equations (33) and (35):

$$B_{23} = \sqrt{(R_{23} x_{norm} - b_{12})^2 + (R_{23} y_{norm})^2 + (R_{23} z_{norm} + R_{12})^2} \quad (36)$$

The length $S_{23}$ is also determined. In order to do so, the length $b_{23}$ is determined. Referring to FIG. 13, the angle $\alpha_3$ is the angle between the cameras C2-C3 epipole and the reference feature P. After stereo rectification this is the angle between the reference feature and the image center (along the x-axis). Since $R_{23}$ is known, $b_{23}$ is obtained:

$$b_{23} = \frac{R_{23}}{\tan \alpha_3} \quad (37)$$

The distance from camera C2 to camera C3 is therefore:

$$S_{23} = B_{23} + b_{23} \quad (38)$$

Using vector locations (33) and (35) and equation (38), the coordinates of the third camera C3, in the reference coordinate system x, y, z, are:

$$x_3 = \frac{S_{23}}{B_{23}} (R_{23} x_{norm} - b_{12}) \quad (39)$$

$$y_3 = \frac{S_{23}}{B_{23}} (R_{23} y_{norm}) \quad (40)$$

$$z_3 = \frac{S_{23}}{B_{23}} (R_{23} z_{norm} + R_{12}) \quad (41)$$

The foregoing embodiment describes how to chain three cameras together, and thus, the features from the second pair of stereo rectified images to the first pair of stereo rectified images. This can be done because there are scene features (e.g. P) that are visible to cameras C1, C2 and C3. The second point cloud can be rescaled and merged with the first point cloud once the third camera location has been determined. Thus, the foregoing process is used to scale and merge the features of the second point cloud associated with the second pair of stereo rectified images to the features of the first point cloud associated with the first pair of stereo rectified images. This is done using the matrix transformations defined above.

In an embodiment, the foregoing chaining process can be generalized to multiple camera positions. In an embodiment, this is done as follows.

Figure 14:
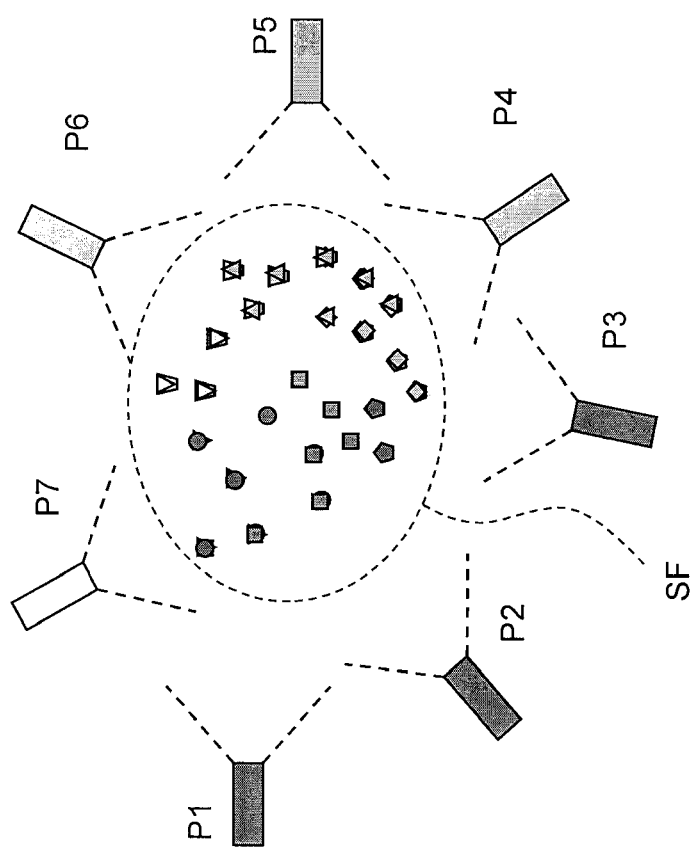
FIGS. 14-15 show a camera moving through multiple positions and observing scene features in accordance with an embodiment.
Figure 15:
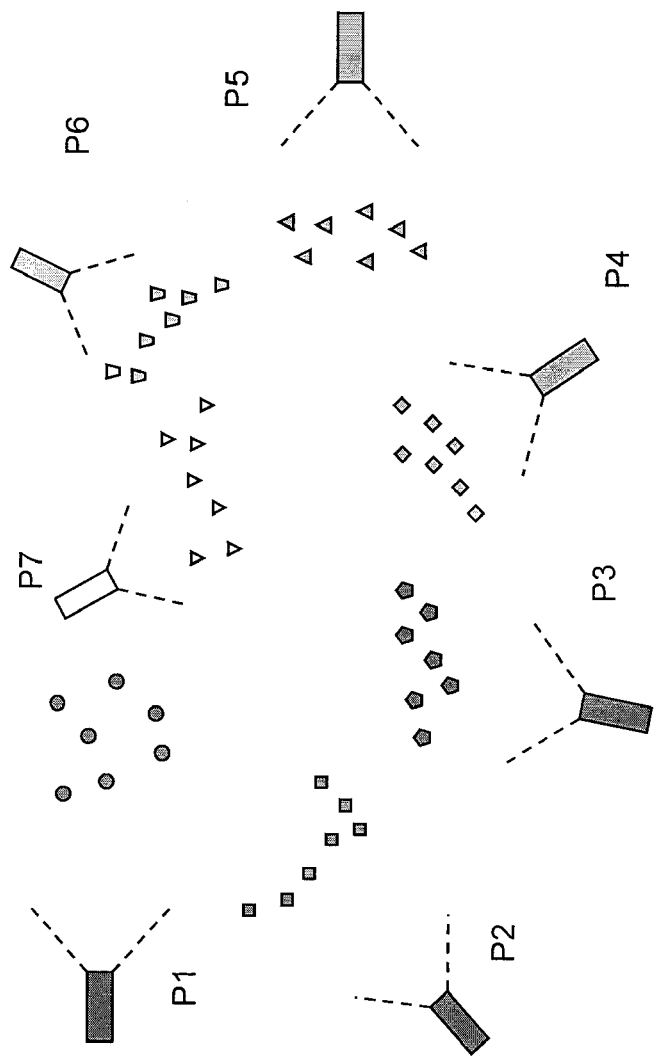
Figure 16:
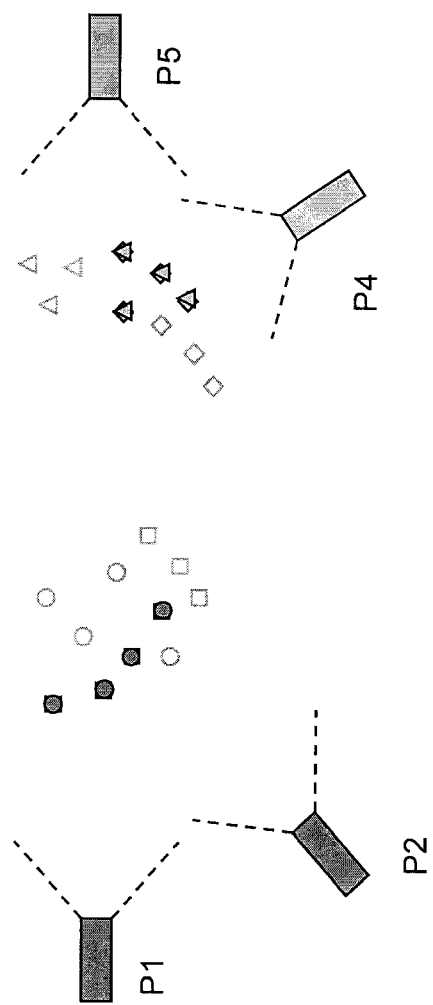
FIG. 16 shows examples of the pair-wise overlaps between cameras in accordance with an embodiment.

Referring now to FIG. 14, this figure shows a camera moving through multiple positions P1, P2, P3, P4, P5, P6 and P7 and observing scene features SF. Instead of a moving camera, it is noted that multiple cameras can be used to observe the scene at positions P1, P2, P3, P4, P5, P6 and P7. Not all features are observed by each camera. In some cases there are no common features between two of the cameras. FIG. 15 dissects what each camera sees:

FIG. 16 shows examples of the pair-wise overlaps between cameras.

In an embodiment, the basic procedure for chaining is to pair up the cameras so that each camera is paired with at least two other cameras (more, if sufficient features are shared). Stereo rectified images are created for each pair of cameras. From these rectified image pairs three dimensional feature point clouds are created for each image pair. The method is outlined in FIG. 5.

In an embodiment, the chaining process involves successive observations of those feature points which are visible from at least three camera positions. The process starts with the first two camera positions P1, P2 in the chain. In accordance with the above described embodiment, these two cameras create a master coordinate system by selecting a particular prominent feature to act as the origin of the master coordinate system. The third camera (or third camera position P3) is then linked to the first two cameras (or first two camera positions P1, P2) by the method described above. This determines the position P3 of the third camera with respect to the first two cameras and the reference coordinate system. It also provides a way of describing the positions of the feature points with respect to the second and third cameras. And, it scales the point cloud generated by the second and third cameras to the reference point cloud created by the first and second cameras.

Figure 17:
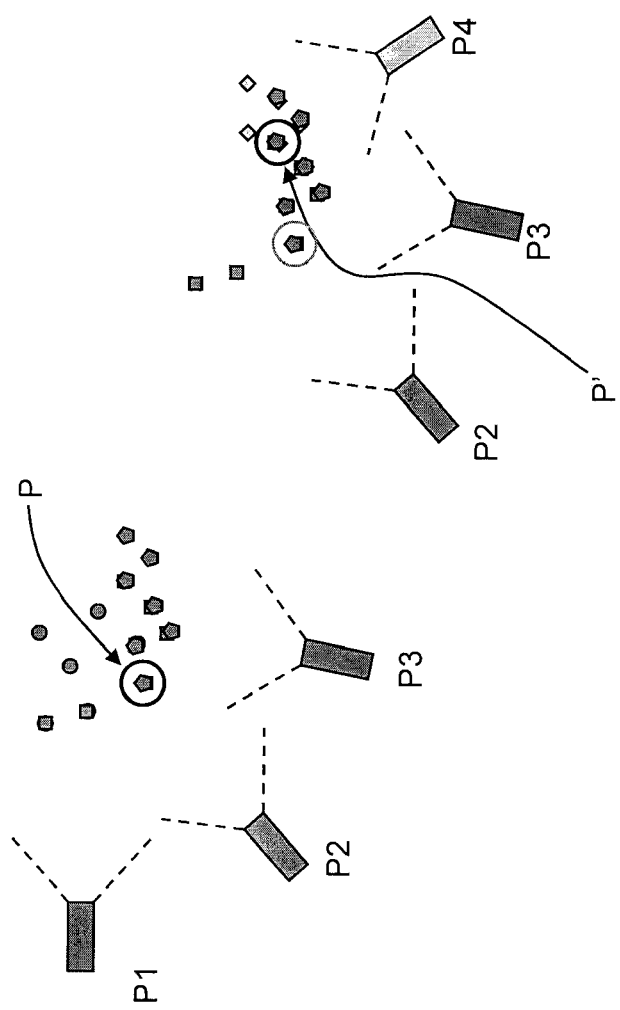
FIG. 17 shows a process for chaining multiple cameras in accordance with an embodiment.

A fourth camera or fourth camera position P4 is then added to the mix and a second camera triplet is then created consisting of the second, third and fourth cameras (or second, third and fourth camera positions P2, P3, P4). These three cameras will see a different mix of trackable features. In order to register this new collection of features with the old collection, a new reference point P', which is visible by both the original triplet and the new triplet, is established. This new reference point P' then acts as the link for the chain which is being constructed. FIG. 17 shows this process.

In this chaining process, the points in the secondary point cloud are properly (though indirectly) registered in the primary point cloud. This means that the secondary point cloud is properly rescaled and oriented so as to match the original reference coordinate system. For this to be possible the position P4 of the fourth camera in the camera 1, camera 2 and reference point coordinate system is determined. The procedures outlined in the above embodiment provide the coordinate transformations that are used.

Chaining then continues, until the last camera position is reached—all new feature points being registered in the original master coordinate system. For all-around point cloud construction, feature clouds from successive camera triplets (cameras N, N+1 and N+2) are successively merged until the starting point is reached. The following double pairings are the minimal case: Camera 1 with camera 2 with camera 3, ... . camera N−1 with camera N with camera 1.

The last double pairing makes it possible to chain backwards, as well as forwards, so as to adjust the estimates in camera location and pose. In an embodiment, two chains are established: Camera 1 to 2 to 3 to 4, etc. And Camera 1 to N to N−1 to N−2, etc.

It will be appreciated that the above described chaining does not require simultaneous visibility of all feature points.

In order to correct the position and pose estimates for each camera position, the full circuit of the clockwise and counterclockwise chains can be performed. Counter chaining may be used to correct residual errors after 360° fly-around. In an embodiment, the position and pose estimates for each camera position can then be averaged between the two chains. This new position information is then used to modify the point cloud fragments and remerge them. The process is then repeated until it reaches a stable equilibrium.

Figure 18:
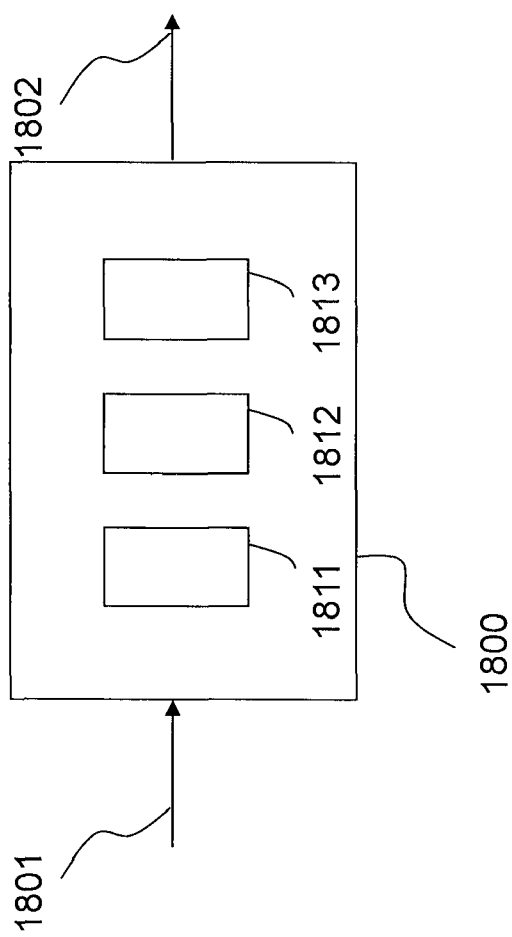
FIG. 18 shows a system for processing images in accordance with an embodiment.

Referring to FIG. 18, this figure shows a system 1800 for processing images in accordance with one embodiment.

The system 1800 includes a stereo rectification module 1811 configured to stereo rectify images 1801 (e.g. captured in real-time). The system 1800 also includes a position determination module 1812 configured to determine the locations of the features of the first point cloud with respect to a reference feature in the first point cloud, and a scaling and merging module 1813 configured to scale and merge a second point cloud of features associated with the second pair of stereo rectified images to the first point cloud of features. The system 1800 outputs a stream of linked images 1802.

The position determination module 1812 and the scaling and merging module 1813 are configured to perform one or more transformations described above.

The different modules of FIG. 18 may include one or more processors, memories and/or dedicated circuitries to carry out the required operations.

The methods described above can be used to process images in many applications, including, for example, military and commercial applications. Military applications may include: improved situational awareness; persistent surveillance; training; battle rehearsal; target recognition and targeting; GPS denied precision navigation; sensor fusion; mission system integration; and military robotics. Commercial and industrial application may include: geography and mapping; motion picture and television applications; architecture and building planning; advertising; industrial and general robotics; police and fire protection and school instruction. However, this is not limiting. It is envisioned to use the above described methods and systems in other applications.

Furthermore, the processing of the images described according to the above embodiments can be performed in real-time.

It will be appreciated that the different operations involved in processing the images may be executed by hardware, software or a combination of hardware and software. Software may include machine executable instructions or codes. These machine executable instructions may be embedded in a data storage medium of the processor module. For example, the machine executable instructions may be embedded in a data storage medium of modules 1811, 1812 and 1813 of the system of FIG. 18.

The software code may be executable by a general-purpose computer. In operation, the code and possibly the associated data records may be stored within a general-purpose computer platform. At other times, however, the software may be stored at other locations and/or transported for loading into an appropriate general-purpose computer system. Hence, the embodiments discussed above involve one or more software or computer products in the form of one or more modules of code carried by at least one physical, non-transitory, machine-readable medium. Execution of such codes by a processor of the computer system enables the platform to implement the functions in essentially the manner performed in the embodiments discussed and illustrated herein.

As used herein, terms such as computer or machine "readable medium" refer to any medium that participates in providing instructions to a processor for execution. Such a medium may take many forms, including but not limited to, non-transitory non-volatile media, and volatile media. Non-volatile media include, for example, optical or magnetic disks, such as any of the storage devices in any computer(s) operating as discussed above. Volatile media include dynamic memory, such as the main memory of a computer system. Common forms of computer-readable media therefore include, for example: a floppy disk, a flexible disk, hard disk, magnetic tape, any other magnetic medium, a CD-ROM, DVD, any other optical medium, less commonly used media such as punch cards, paper tape, any other physical medium with patterns of holes, a RAM, a PROM, and EPROM, a FLASH-EPROM, any other memory chip or cartridge. Many of these forms of computer readable media may be involved in carrying one or more sequences of one or more instructions to a processor for execution.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method for processing stereo rectified images, each stereo rectified image being associated with a camera position, the method comprising:
   selecting a first pair of stereo rectified images;
   determining a first point cloud of features from the pair of stereo rectified images;
   determining the locations of the features of the first point cloud with respect to a reference feature in the first point cloud;
   selecting a second pair of stereo rectified images so that one stereo rectified image of the second pair is common to the first pair, and
   scaling a second point cloud of features associated with the second pair of stereo rectified images to the first point cloud of features, wherein the scaling further comprises treating each point cloud as a single vector, determining a norm for each single vector, and scaling each point in the cloud by dividing said each point by said norm for a respective single vector, and wherein the method is executed by one or more processors.

2. The method of claim 1, wherein the scaling includes determining a camera position associated with the stereo rectified image in the second pair of images that is not common to the first pair relative to the reference point.

3. The method of claim 1, further comprising selecting a third pair of stereo rectified images so that one stereo rectified image in the third pair is common to the second pair, and scaling a third point cloud of features associated with the second and third pairs of stereo rectified images to a point cloud of features associated with the first and second pairs of stereo rectified images.

4. The method of claim 3, wherein scaling the third point cloud includes determining the camera position associated with the stereo rectified image in the third pair of images that is not common to the second pair relative to the reference point.

5. The method of claim 1, further comprising selecting a n+2th pair of stereo rectified images so that one stereo rectified image in the n+2th pair is common to a n+1th pair of stereo rectified images, and scaling a point cloud of features associated with the n+2th and n+1th pairs of stereo rectified images to a point cloud of features associated with a nth and the n+1th pairs of stereo rectified images, where n is an integer equal to or greater than 1.

6. The method of claim 5, further comprising iteratively selecting the n+2th pair of stereo rectified images and scaling the point cloud of features associated with the n+2th and n+1th pairs of stereo rectified images until the n+2th pair of stereo rectified images includes a stereo rectified image of the first pair.

7. The method of claim 1, wherein the stereo rectified images are images captured by a moving camera.

8. The method of claim 1, wherein stereo rectified images are images captured by a plurality of cameras.

9. The method of claim 1, wherein the reference feature is an image feature in the stereo rectified images of the first and second pair of stereo rectified images.

10. An article of manufacture comprising a physical, non-transitory computer readable medium encoded with machine executable instructions for performing a method for processing stereo rectified images, each stereo rectified image being associated with a camera position, the method comprising:
    selecting a first pair of stereo rectified images; determining a first point cloud of features from the pair of stereo rectified images;
    determining the locations of the features of the first point cloud with respect to a reference feature in the first point cloud;
    selecting a second pair of stereo rectified images so that one stereo rectified image of the second pair is common to the first pair; and
    scaling a second point cloud of features associated with the second pair of stereo rectified images to the first point cloud of features, wherein the scaling further comprises treating each point cloud as a single vector, determining a norm for each single vector, and scaling each point in the cloud by dividing said each pint by said norm for a respective single vector.

11. The article of claim 10, further comprising machine executable instructions for performing selecting a third pair of stereo rectified images so that one stereo rectified image in the third pair is common to the second pair, and scaling a third point cloud of features associated with the second and third pairs of stereo rectified images to a point cloud of features associated with the first and second pairs of stereo rectified images.

12. The article of claim 11, wherein scaling the third point cloud includes determining the camera position associated with the stereo rectified image in the third pair of images that is not common to the second pair relative to the reference point.

13. The article of claim 10, further comprising machine executable instructions for performing selecting a n+2th pair of stereo rectified images so that one stereo rectified image in the n+2th pair is common to a n+1th pair of stereo rectified images, and scaling a point cloud of features associated with the n+2th and n+1th pairs of stereo rectified images to a point cloud of features associated with a nth and the n+1th pairs of stereo rectified images, where n is an integer equal to or greater than 1.

14. The article of claim 13, further comprising machine executable instructions for performing iteratively selecting the n+2th pair of stereo rectified images and scaling the point cloud of features associated with the n+2th and n+1th pairs of stereo rectified images until the n+2th pair of stereo rectified images includes a stereo rectified image of the first pair.

15. The article of claim 10, wherein the stereo rectified images are images captured by a moving camera.

16. The article of claim 10, wherein stereo rectified images are images captured by a plurality of cameras.

17. The article of claim 10, wherein the reference feature is an image feature in the stereo rectified images of the first and second pair of stereo rectified images.

\* \* \* \* \*